US008069310B1

United States Patent
Levin-Michael et al.

(10) Patent No.: US 8,069,310 B1
(45) Date of Patent: Nov. 29, 2011

(54) METHODS AND SYSTEMS FOR INCORPORATING SEQUENTIAL STREAM READ REQUESTS INTO PREFETCH MANAGEMENT FOR DATA STORAGE HAVING A CACHE MEMORY

(75) Inventors: Orit Levin-Michael, Newton, MA (US);
Peng Yin, South Grafton, MA (US);
William N. Eagle, Oxford, MA (US);
Stephen F. Modica, Uxbridge, MA (US); Rong Yu, Franklin, MA (US)

(73) Assignee: EMC Corporation, Hopkinton, MA (US)

( * ) Notice: Subject to any disclaimer, the term of this patent is extended or adjusted under 35 U.S.C. 154(b) by 923 days.

(21) Appl. No.: 11/726,744

(22) Filed: Mar. 22, 2007

(51) Int. Cl.
*G06F 12/00* (2006.01)
*G06F 13/00* (2006.01)
*G06F 13/28* (2006.01)

(52) U.S. Cl. ...................................................... 711/137

(58) Field of Classification Search ......................... None
See application file for complete search history.

(56) References Cited

U.S. PATENT DOCUMENTS

| 5,206,939 A | 4/1993 | Yanai et al. |
| 5,537,568 A * | 7/1996 | Yanai et al. ................... 711/118 |
| 5,600,817 A * | 2/1997 | Macon et al. ................. 711/137 |
| 5,778,394 A | 7/1998 | Galtzur et al. |
| 5,845,147 A | 12/1998 | Vishlitzky et al. |
| 5,857,208 A | 1/1999 | Ofek |
| 6,430,653 B1 * | 8/2002 | Fujikawa ....................... 711/113 |

* cited by examiner

*Primary Examiner* — Kevin Ellis
*Assistant Examiner* — Gary W Cygiel
(74) *Attorney, Agent, or Firm* — Muirhead and Saturnelli, LLC

(57) ABSTRACT

Data units are prefetched into a cache memory by executing a first prefetch task to prefetch a first prefetch series of data units from off-cache. A first prefetch operation is executed to prefetch and store a first selected set of data units. Decisions are made about the first prefetch task, subsequent prefetch operations and prefetch tasks based on in-cache data units associated with the first prefetch task and on other data units that are read from off-cache but that are not associated with the first prefetch task. A determination is made whether an additional data unit that is read from an off-cache logical location is a first prefetch series member. If so, it is associated with the first prefetch task, and, for decision making, is treated as having been prefetched into cache in accordance with the first prefetch task.

20 Claims, 8 Drawing Sheets

METHODS AND SYSTEMS FOR INCORPORATING SEQUENTIAL STREAM READ REQUESTS INTO PREFETCH MANAGEMENT FOR DATA STORAGE HAVING A CACHE MEMORY

RELATED APPLICATIONS n/a

BACKGROUND OF THE INVENTION

1. Field of the Invention

The present invention relates generally to data management, and more particularly to the management of data in a computer system by a data storage system.

2. Description of the Prior Art

Host processor systems may store and retrieve data using one or more data storage systems containing a plurality of host interface units (host adapters), disk data storage devices, and disk interface units (disk adapters), as well as a cache memory. Such data storage systems are provided, for example, by EMC Corporation of Hopkinton, Mass. and disclosed in U.S. Pat. Nos. 5,206,939 to Yanai et al., 5,778,394 to Galtzur et al., U.S. Pat. No. 5,845,147 to Vishlitzky et al., and U.S. Pat. No. 5,857,208 to Ofek. The host systems access the data storage systems through a plurality of channels provided therewith. Host systems provide data and access control information through the channels of the data storage systems and the data storage systems provides data to the host systems also through the channels. The host systems do not address the disk data storage devices of the data storage system directly, but rather, access what appears to the host systems as a plurality of logical volumes. These logical locations are mapped into physical locations on the disk data storage devices, but the logical volumes may be larger or smaller than the corresponding disk data storage devices, and may span multiple drives. A single logical location may also be mapped to multiple physical locations, when, for example, data mirroring is desired.

Cache memory may be used to store frequently accessed data for rapid access. Typically, it is time-consuming to read or compute data stored in the disk data storage devices. However, once data is stored in the cache memory, future use can be made by accessing the cached copy rather than reading it from the disk data storage device, so that average access time to data may be made lower.

One technique for expediting read requests involves prefetching data units so that more data units will available from cache memory rather than from disk storage. Typically, prefetching is implemented by reading data units in blocks in response to one or more requests to read a data unit. Since a request to read a specific data unit increases the likelihood that access to other, related data units will soon be required, the read request for the data unit may trigger a prefetch request to read related data units as well, particularly when a read request results in reading a data unit off-cache rather than from the cache memory.

Rules may be developed to govern the triggering of a prefetch operation. For example, a prefetch operation may be executed upon issuance of a single request to read a data unit off-cache. Alternatively, a prefetch operation may not be triggered by a selected number of read requests for an off-cache data unit.

When, in the course of executing a read request, the requested data unit is found in-cache, the operation constitutes a "Hit." If the requested data unit is not found in-cache, the operation constitutes a "Miss."

Sequential prefetching, which involves reading blocks of adjacent data units, assumes that data units that are adjacent to a requested data unit are also likely to be accessed. In fact, access requests often involve data units that are sequential. Recognizing that the physical devices, such as disks, upon which data is stored off-cache, are organized and segmented into one or more logical volumes (LVs), the addresses of the adjacent data units may not be physically sequential on the disk, but they will be sequential on the logical volume to which the data on the disk is mapped.

As an example, consider a series of six adjacent data units, namely (a, b, c, d, e, f). If requests to read the data units a, b and then c are issued by a host processor for use in an I/O operation, a sequential access of data units (a, b, c) may be recognized, leading to the assumption that data units d, e and f will also be needed. In response, a prefetch task for prefetching the sequential stream of data units may be opened. A first prefetch operation is initiated under the prefetch task to prefetch data units d and e. When the first prefetch operation is completed, a second prefetch operation is initiated under the prefetch task to prefetch data units f and g. More than one prefetch task may be opened at the same time, executing prefetch operations for different sequential streams of data units.

Prefetching requires a significant number of cache-slots to be available in the cache memory. When long sequences of data units are prefetched into the cache memory, other data units typically have to be removed in the cache memory in order to make room for the newly prefetched data units.

One problem with prefetching is that the data units that are prefetched are not necessarily going to be accessed, for example by a host processor. A possibility arises that the host processor will access them because they are adjacent to a data unit that it had required, but it is not a certainty that the host processor will require the prefetched data units. Prefetching involves retrieving data units that the host may or may not need. On the other hand, prefetching involves removing in-cache data units that still have some probability of being accessed. Therefore, prefetching raises the possibility that data units for which the host processor requires access may be replaced by data units for which the host processor does not and never will require access. It is therefore, important to remove cache data that is not likely to be still required by the data storage system. Cache Pollution is defined to be the population of the cache memory with data units that are not required for re-accessing, for example, by a host processor.

One data caching process for determining which data units in a cache memory to overwrite is the Least Recently Used (LRU) process, which discards the least recently used data units first, operating under the assumption that the data unit that was the earliest accessed (for example, by a host processor), is the data unit that is likeliest not to be required by a host processor again. Therefore, in the LRU process, the data unit to remove in a cache memory is the least recently used data unit. The cache-slot that holds the least recently used data unit may be known as the "LRU cache-slot".

Other data caching processes decide which data units to remove based on the Tagged Based Cache (TBC) or the LRU time stamp (LRUTS) rather than the LRU data unit. Despite the data caching process used, it is necessary to keep track of which data units were accessed or used and when, which may be expensive in time and resources.

In a long sequential stream, the data units that had been prefetched into the cache memory and accessed by the host processor are not likely to be re-accessed by the host processor, and thus constitute cache pollution.

A feature known as "tail cutting" or simply "cutting" may be used to reduce this form of cache pollution. In tail cutting, a maximum number of data units may be stored in the cache memory pursuant to a prefetch task. Once the maximum number has been prefetched into cache memory, certain data units will be removed from the cache memory to make room for data units prefetched pursuant to the prefetch task or pursuant to another prefetch task.

For example, if thirty five is chosen as the maximum number of data units to be stored in cache memory pursuant to a first prefetch task, after thirty five data units are prefetched and stored in the cache memory, if one more data unit is prefetched to store in cache memory, a data unit earlier prefetched pursuant to the first prefetch task and already read by the host will be removed from cache memory to make room for the newly prefetched data unit.

A data storage system featuring sequential prefetching operations with tail cutting is disclosed in U.S. Pat. No. 5,537,568, entitled System For Dynamically Controlling Cache Manager Maintaining Cache Index And Controlling Sequential Data Access, Yanai, et al., which is hereby incorporated by reference.

Tail cutting can limit cache pollution due to sequential prefetching so long as the prefetch operation executes quickly enough that data units are prefetched and stored in the cache memory faster than they are required in a read request. Returning to the example provided above, when a prefetch operation is issued in response to a request to read a data unit d, it should be noted that the next read request is likely to be for a data unit e that is adjacent to the data unit d. The adjacent data unit e will be in the block of data units being prefetched pursuant to the first prefetch operation.

When the prefetch operation executes faster than a host processor can request a read of its next data unit, storage of the adjacent data unit e in the cache memory will have been completed before issuance of the next read command. A read request for the data unit e will result in a Hit (data unit e being found in-cache), and the data unit e will be read from its cache-slot. However, when the prefetch operation executes more slowly than the host processor can request a read of its next data unit through the host adapter, the adjacent data unit e may not yet be stored in the cache memory and the read request will result in a Miss (data unit e not being found in-cache). The data unit e will be read from its location off-cache.

As noted before, a read request for data units that are out-of-cache will take longer to execute than a request for data units that are in-cache. Therefore, it is not preferable to retrieve the data unit e from its location off-cache if it can be read from an in-cache location. In addition, procedurally, a disk adapter will execute a read request before it completes a prefetch operation. Therefore, the disk adapter will execute the read request for the data unit e before it completes the prefetch operation in which the data unit e would have been retrieved.

Finally, a Miss operation may result in not updating the count of the number of prefetched data units in the sequence being prefetched pursuant to the prefetch task. The prefetched data unit count was being made in anticipation of making a tail cut on the original prefetch operation. This will impact future prefetches and future tail cuts.

The problem is further exacerbated when a host adapter then issues a read request for the data unit f, which is adjacent to data unit e, and which would have been prefetched pursuant to the second prefetch operation, which had not been initiated yet. The second prefetch operation would not have had an opportunity to prefetch data unit f into the cache memory. Therefore, the read request for data unit f will result in a Miss operation and will proceed to read data unit f from its off-cache logical location. As previously indicated, the physical devices which store data off-cache are organized and segmented into logical volumes, and in sending a read request off-cache, the logical address requested will be mapped to the corresponding physical location. Off-cache logical location means the physical location in the data storage devices, e.g. disk data storage devices, of this part (IN THIS CASE, DATA UNIT F) of the logical volume. Once again, the prefetch operation is disrupted and the prefetched data unit count is not updated.

Three kinds of Miss operations may be defined. A Short Miss (SM) operation occurs when prefetching of a data unit had started but not been completed before the issuance of a read request for the data unit. The new input/output (I/O) request was received from the host processor to read a data unit that is currently in the middle of prefetch operation. A Long Miss (LM) operation occurs when the command to start a prefetch operation had issued, but had not been sent to the disk before the issuance of a read request for a data unit. The new I/O instruction was received from the host processor to read a data unit that was going to be prefetched next. A Read Miss operation occurs when a new I/O request is issued for a data unit for which no plans to prefetch were yet made. In all three cases the data is not in-cache when a read request issues.

Using the example of the prefetches above, in which a sequential access is detected upon reading of data units a, b, c, and a first prefetch task is opened to prefetch the new sequential stream started by data units a, b, c, the first prefetch task issues a first prefetch operation for prefetching data units d, e, followed by a second prefetch operation for prefetching data units f, g. It can be seen in the example that sequential prefetching tasks are opened after three Miss operations.

Consider the situation in which the timing of prefetch operations relative to the timing of read requests is such that, after prefetching five data units, the data units required for reading by the host processor will not have yet been prefetched into the cache memory. Returning to the example, when a prefetch task opens in response to a read request for data unit c, the data storage system is able to complete the prefetching of data units d, e, f, g, h, but will not have stored data unit i before a read request for data unit i is issued. Read requests for data units i, j, and k result in Miss operations and in a recognition of a new sequence (i, j, k, . . . ). In response thereto, a new prefetch task may be opened to fill the cache memory with the new sequence (i, j, k . . . ).

The data units i, j, k are not identified as related to the prefetch task with which the data units d, e, f were prefetched. Therefore, they will not be used as part of a prefetched data unit count to determine when tail cutting is appropriate for the prefetch task in which data units d, e, f were prefetched. In addition, the data units i, j, k will remain in storage in cache memory longer than had they been identified as related to the prefetch task with which the data units d, e, f were prefetched. Because they are not recognized as stored pursuant to the prefetch task, they will not be recycled (i.e., removed from the cache memory) pursuant to the tail cut of the prefetch task. For recycling purposes, they will be treated as general data units stored in cache memory, therefore remaining in cache memory longer than they would have remained had they been identified as related to the prefetch task with which the data units d, e, f were prefetched. Further, the data units d, e, f in the prefetch task will also remain in cache memory longer than they would have had the data units i, j, k been recognized as part of the prefetch task. Even though the sequential activity continues, there are no new data units retrieved pursuant to the prefetch task to which the data units d, e, f are associated. Therefore, the data units d, e, f will not be recycled. Such prefetch tasks are known as orphan prefetches, and sequences of data units associated with them are known as orphan prefetch sequences.

A second prefetch sequence may be recognized, and a second prefetch task may be opened in response. The second prefetch task issues prefetch operations to prefetch data units into the cache memory. As a new sequence, starting with data unit i, begins to be prefetched into the cache memory, the data unit i constitutes the start of a new sequence count. Recalling that the data system is not capable of prefetching faster than the issuance of a sixth read request, the data units (i, j, k, l, m) are prefetched, but read requests for data units n, o, p also result in Miss operations. The data units n, o, p will not be identified as related to the second prefetch task with which the data units i, j, k were prefetched. Therefore, they will not be used as part of the prefetched data unit count to determine when tail cutting is appropriate for the second prefetch task in which data units i, j, k were prefetched. In addition, the data units n, o, p will be treated as general data units and remain in storage in cache memory longer than had they been identified as related to the prefetch task with which the data units i, j, k were prefetched. Further, the second prefetch task also constitutes an orphan prefetch, and the data units i, j, k associated with it constitute another orphan prefetch sequence that will not be recycled. The second prefetch task may also be terminated before completion and a third prefetch task may be opened to fill the cache memory.

Starting and stopping prefetch operations and tasks have administrative overhead associated with them. Therefore, it is not preferable to stop a prefetch operation or task and start others for the same series of data units. It can be seen then that prefetching with a tail cut, as it is conventionally implemented in data storage system, will only execute to completion when a data storage system is able to prefetch and store data units in the cache memory faster than the data units are required for read requests. It would be advantageous to provide a prefetch implementation in which the data storage system prefetches and stores data units in the cache memory and make decisions on the execution of prefetch operations and data unit storage, including tail cutting, even when read requests issue for data units before a prefetch operation is completed or even issued.

SUMMARY OF THE INVENTION

Advantages of the invention will be set forth in part in the description which follows, and in part will be obvious from the description, or may be learned by practice of the invention. The advantages of the invention will be realized and attained by means of the elements and combinations particularly pointed out in the appended claims and equivalents thereof.

In accordance with the invention, as embodied and broadly described herein, in one embodiment, the invention comprises a method for prefetching data units into a cache memory. The method comprises executing a prefetch task, called hereinafter a first prefetch task, to prefetch a first prefetch series of data units from off-cache logical locations for storage in the cache memory. A first prefetch operation is initiated to prefetch a first selected set of data units and to store the data units in the cache memory in accordance with the first prefetch task. Note that the term "first prefetch operation" as used herein is not meant to be limited to the very first prefetch operation issued pursuant to a prefetch task. The term "first prefetch operation" as used herein is merely meant to uniquely identify a specific prefetch operation, in which a specific set of data units is prefetched and stored in the cache memory in accordance with a specific prefetch task. Decisions about the first prefetch task, the first prefetch operation and subsequent prefetch operations and prefetch tasks are made based on read requests, the data units requested by the read requests, and the data units that are stored in the cache memory and that are associated with the first prefetch task.

When an additional data unit is read from an off-cache logical location, the method involves determining whether or not the additional data unit is a data unit in the first prefetch series (hereinafter a first prefetch series member). Upon determination that the additional data unit is a first prefetch series member, the additional data unit is associated with the first prefetch task. The additional data unit is treated as having been prefetched into cache memory in accordance with the first prefetch task upon the associating of the additional data unit with the first prefetch task.

In one aspect of the method embodiment, the additional data unit is determined to be a first prefetch series member upon detection of a read request for reading the additional data unit from the off-cache logical location. In a further aspect, the determination is made by identifying at least one data unit meets the following criteria: it is stored in the cache memory; it is associated with the first prefetch task; and it has a logical location that is within a selected number of data units from the logical location of the additional data unit. Any data unit so identified is associated with the first prefetch task so that each data unit so identified will be treated as being prefetched into the cache memory pursuant to the first prefetch task.

In another aspect of the method embodiment, a review is conducted of selected data units stored in the cache memory to determine whether or not any of the data units stored in the cache memory is a first prefetch series member. In a further aspect of this embodiment, a head data unit and a most recently requested data unit are identified.

The head data unit is a data unit that meets the following criteria: it is currently stored in cache memory; it is associated with the first prefetch task; and it is the data unit in the sequence being prefetched pursuant to the first prefetch task that has a logical location closest in proximity to the logical location of the data unit that is first in the sequence being prefetched pursuant to the first prefetch task. The head data unit has a head logical location associated therewith. The most recently requested data unit is a data unit that meets the following criteria: it is stored in the cache memory; it is associated with the first prefetch task; and it was most recently requested in a read request of all of the data units stored in the cache memory and associated with the first prefetch task. The most recently requested data unit has a most recently requested logical location associated therewith.

The review involves identifying an in-cache set of data units, which is a set of data units that have been stored in the cache memory and that have logical locations between the head logical location and the most recently requested logical location. The in-cache set of data units are associated with the first prefetch task so that each data unit in the in-cache set will be treated as having been prefetched into the cache memory pursuant to the first prefetch task.

In another aspect of the method embodiment, making decisions comprises maintaining a maximum number of data units that are associated with the first prefetch task in the cache memory. When the number of data units that are associated with the first prefetch task in the cache memory exceeds the maximum number, one or more data units that are associated with the first prefetch task are removed from storage in cache memory.

In another aspect of the method embodiment, making decisions comprises issuing an instruction to execute a second prefetch operation for the first prefetch task for prefetching a second selected set of data units from off-cache logical locations for storage in the cache memory, based on association of the additional data unit with the first prefetch task and the logical location of the additional data unit. Note that the term "second prefetch operation" as used herein is not meant to be limited to a prefetch operation immediately following the first prefetch operation. It is as much within the contemplation of the invention that several instructions for prefetch operations are issued before an additional data unit is identified as being associated with the first prefetch task, as it is within the contemplation of the invention that no instructions for prefetch operations are issued before the additional data unit is identified as being associated with the first prefetch task. The term "second prefetch operation" as used herein is merely meant to uniquely identify a specific prefetch operation that is different from and subsequent to the first prefetch operation. It can be seen that the second prefetch operation occurs after an additional data unit is identified as being associated with the first prefetch task. In further aspects of this embodiment, the second prefetch operation has associated therewith a selected number of data units in the second selected set and a set of logical locations from which to prefetch the second selected set. The selected number and the set of logical locations for the second selected set are selected with reference to the logical location of the additional data unit.

In another aspect of the method embodiment, when a plurality of additional data units is read from an off-cache logical location, and each has been associated with the first prefetch task, making decisions comprises determining whether to continue or terminate any prefetch operation of the first prefetch task, based on the additional data units, the number of additional data units, associations of the additional data units with the first prefetch task, and the logical locations of the additional data units.

In another aspect of the method embodiment, when the additional data unit is not determined to be a first prefetch series member, a determination is made as to whether the additional data unit is a member of a second series of data units being read from off-cache logical locations. When the additional data unit is a member of a second series, a decision process is initiated to determine appropriateness of opening a second prefetch task to prefetch the second prefetch series of data units for storage in the cache memory.

In another embodiment of the invention, a prefetch management system for monitoring and controlling prefetches of data units into a cache memory has a prefetch task executor for executing a first prefetch task to prefetch a first prefetch series of data units from off-cache logical locations for storage in the cache memory. The prefetch task executor has a prefetch operation initiator for initiating a first prefetch operation to prefetch a first selected set of data units; and a cache storing unit for storing data units in the cache memory in accordance with the first prefetch task.

The prefetch management system also has a prefetch decision unit for making decisions about the first prefetch task, the first prefetch operation and subsequent prefetch operations and prefetch tasks based on read requests, the data units requested by the read requests, and the data units that are stored in the cache memory and that are associated with the first prefetch task.

The prefetch management system also has a prefetch set member identifier for determining whether or not an additional data unit that is read from an off-cache logical location is a first prefetch series member. The prefetch management system also has a prefetch task association unit for associating the additional data unit with the first prefetch task upon determination that the additional data unit is a first prefetch series member. The prefetch decision unit is arranged to treat data units as having been prefetched into cache memory in accordance with the first prefetch task upon the associating of the additional data unit with the first prefetch task.

In another aspect of the prefetch management system embodiment, the prefetch set member identifier is arranged to determine whether or not the additional data unit is a first prefetch series member upon detection of a read request for reading the additional data unit from the off-cache logical location. In a further aspect of this embodiment, the prefetch set member identifier is arranged to determine whether or not the additional data unit is a first prefetch series member through a review of the logical locations of selected data units stored in the cache memory. The prefetch set member identifier has an in-cache data unit reviewer to conduct a review of the logical locations of the selected data units stored in the cache memory to determine whether or not any of the selected data units stored in the cache memory is a first prefetch series member.

In another aspect of the prefetch management system embodiment, the prefetch decision unit has a maximum data unit manager for maintaining a maximum number of data units that are associated with the first prefetch task in the cache memory. When the number of data units that are associated with the first prefetch task in the cache memory exceeds the maximum number, maximum data unit manager is arranged to remove from storage in cache memory one or more data units that are associated with the first prefetch task.

In another aspect of the prefetch management system embodiment, the prefetch operation initiator is arranged to issue an instruction to execute a second prefetch operation for prefetching a second selected set of data units from off-cache logical locations for storage in the cache memory. The prefetch decision unit is arranged to instruct the prefetch operation initiator to issue an instruction to execute the second prefetch operation based on association of the additional data unit with the first prefetch task and the logical location of the additional data unit.

In other aspects of the prefetch management system embodiment, the second prefetch operation has associated therewith a selected number of data units in the second selected set and a set of off-cache logical locations from which to prefetch the second selected set. The prefetch decision unit is further arranged to select the selected number and the set of logical locations with reference to the logical location of the additional data unit.

In another aspect of the prefetch management system embodiment, when a plurality of additional data units is read from an off-cache logical location and each has been associated with the first prefetch task, the prefetch decision unit is further arranged to determine whether to continue or terminate any prefetch operation of the first prefetch task, based on the additional data units, the number of additional data units, associations of the additional data units with the first prefetch task, and the logical locations of the additional data units.

In another embodiment of the invention, a computer program product residing on a computer readable medium for prefetching data units into a cache memory is provided. The computer program product has instructions for causing a computer to open a first prefetch task to prefetch a first prefetch series of data units from off-cache logical locations for storage in the cache memory. The instructions for causing a computer to open have instructions for causing a computer to initiate a first prefetch operation to prefetch a first selected set of data units and store data units in the cache memory in accordance with the first prefetch task.

The computer program product has instructions for causing a computer to make decisions about the first prefetch task, the first prefetch operation and subsequent prefetch operations and prefetch tasks based on read requests, the data units requested by the read requests, and the data units that are stored in the cache memory and that are associated with the first prefetch task.

When an additional data unit is read from an off-cache logical location, the computer program product has instructions for causing a computer to determine whether or not the additional data unit is a first prefetch member. Upon determination that additional data unit is a first prefetch series member, the computer program product has instructions for causing a computer to associate the additional data unit with the first prefetch task. The instructions for causing a computer to make decisions further comprises instructions for causing a computer to treat the additional data unit as having been prefetched into cache memory in accordance with the first prefetch task upon association of the additional data unit with the first prefetch task.

Using the invention herein described, it is possible to provide a user with tail cutting during prefetch operations, even when data units are being read faster than they can be prefetched into cache memory. Where, previously, pollution of cache by Read Miss operations and a multiplicity of short sequences of orphan prefetches would have resulted, use of the empty tail cut process described herein allows a computer system to maintain a tail cut count when data units are being read faster than they can be prefetched into cache memory. The pollution of the cache is avoided. The number of orphan prefetches is reduced while an appropriate number of prefetches into a cache memory is maintained.

It is to be understood that both the foregoing general description and the following detailed description are exemplary and explanatory only and are not restrictive of the invention, as claimed.

The accompanying drawings, which are incorporated in and constitute a part of this specification, illustrate embodiments of the invention and together with the description, serve to explain the principles of the invention.

DESCRIPTION OF THE PREFERRED EMBODIMENT(S)

Reference is now made in detail to exemplary embodiments of the invention, examples of which are illustrated in the accompanying drawings.

Figure 1:
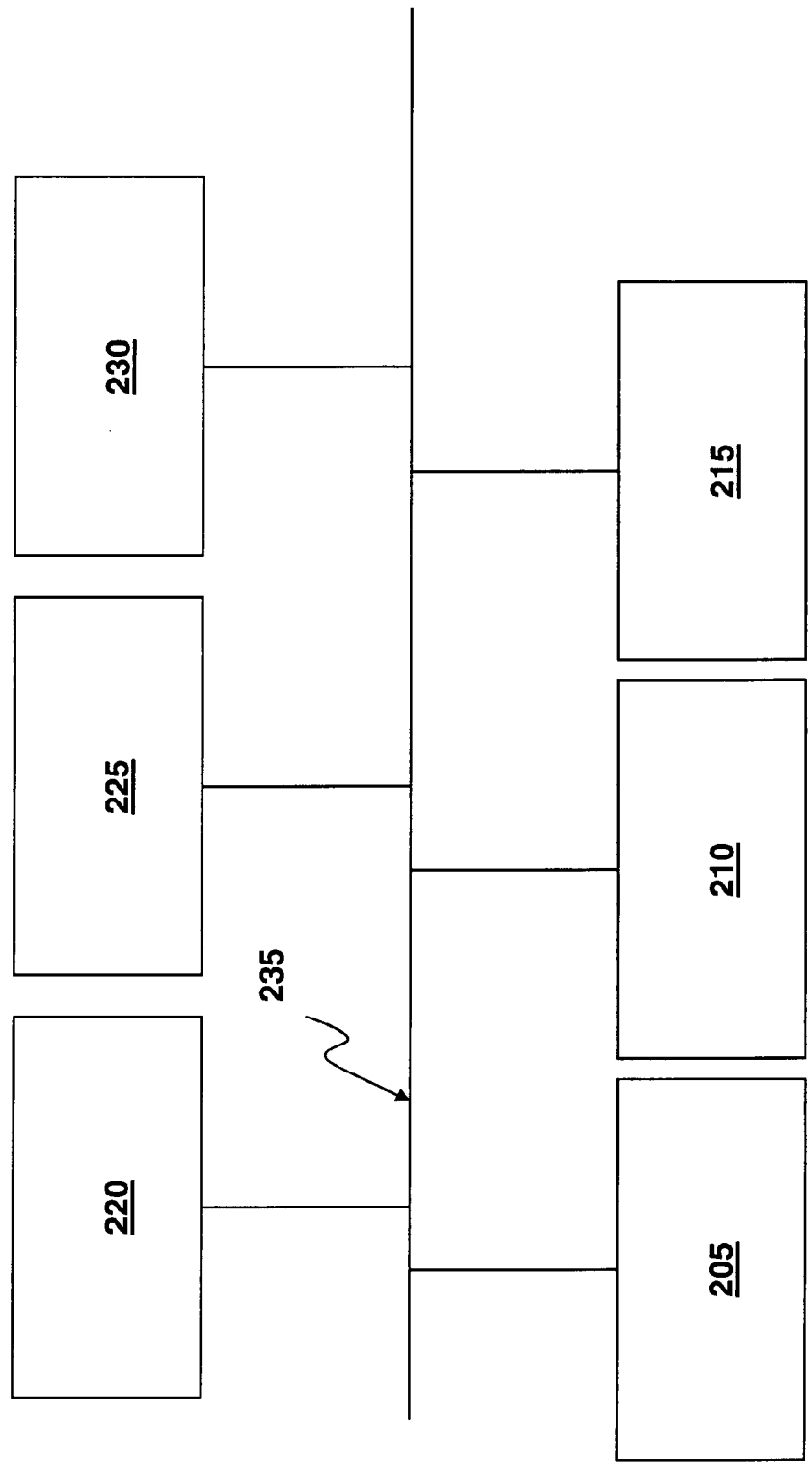
FIG. 1 is a block diagram of a functional architecture for a computer system, according to an embodiment of the invention.

FIG. 1 is a block diagram of a functional architecture for a computer system including a data storage system, according to an embodiment of the invention.

As shown in FIG. 1, host processors, or hosts, or host systems 205, 210, and 215, are coupled to each of data storage systems 220, 225, and 230, via communications link 235. Link 235 may be or include the Internet, an intranet, a wired link, a wireless link, or other link, and may utilize Transmission Control Protocol/Internet Protocol (TCP/IP), Small Computer System Interface (SCSI), Fibre Channel, or other communications protocol. Link 235 may also represent a plurality of links of the same or different types; all or a portion of these links may be redundant. Any host can access data in any one or more data storage systems, and data may be transferred between data storage systems.

Variations to the architecture illustrated in FIG. 1 are possible. For example, the number of hosts need not equal the number of data storage systems. And there is no theoretical limit to the number of either type of functional component.

Figure 2:
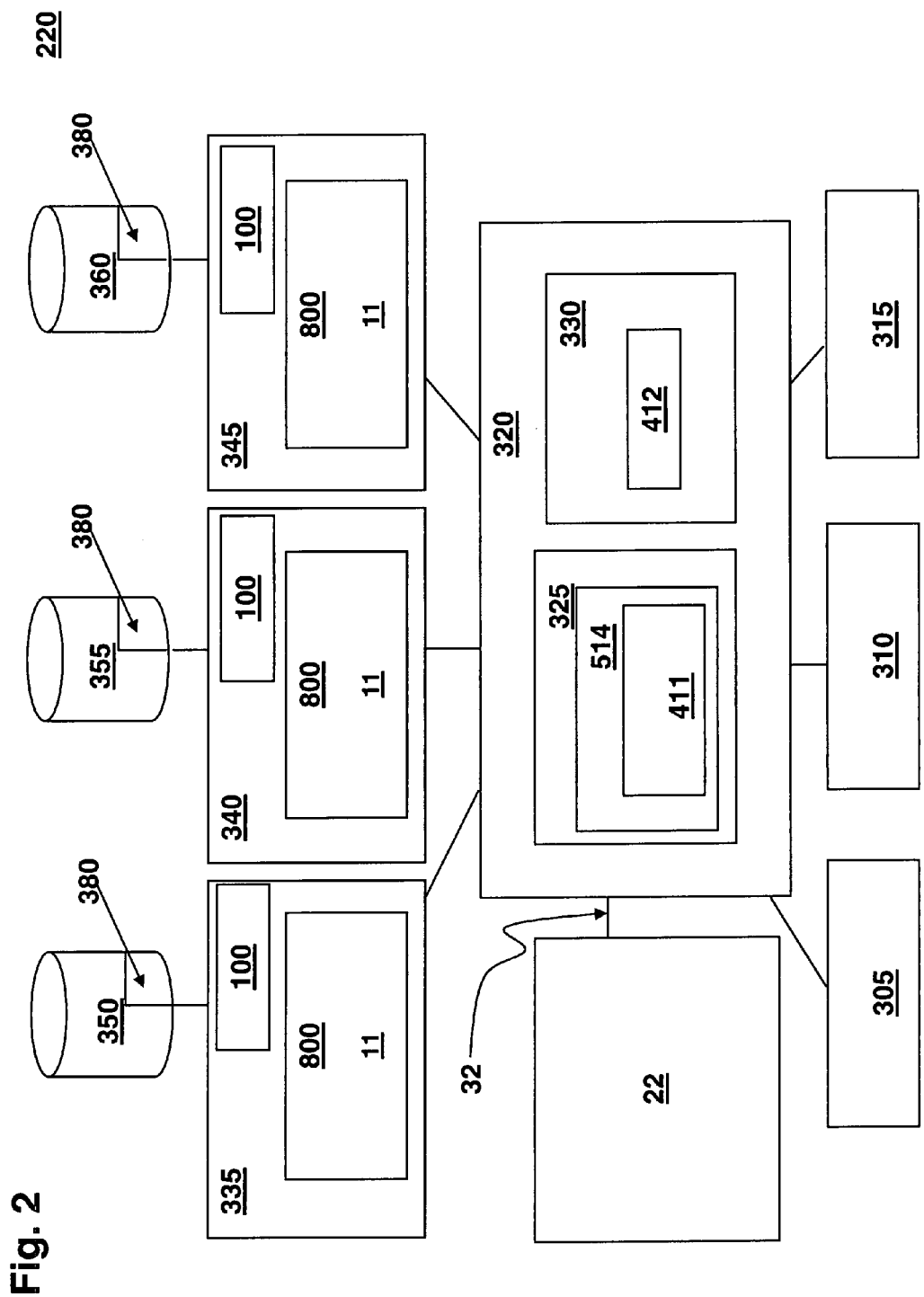
FIG. 2 is a block diagram of a functional architecture of a data storage system in a computer system, according to an embodiment of the invention.

FIG. 2 is a block diagram of a functional architecture of a data storage system 220, according to an embodiment of the invention. The block diagram illustrated in FIG. 2 represents an exemplary embodiment of any one or more of data storage systems 220, 225, and 230. As illustrated in FIG. 2, the system 220 may also include one or more host adapters 305, 310, and 315, which are coupled to a cache memory 320. One or more of the host adapters 305, 310, and 315 may be or include, for example, a Fibre Channel adapter. In operation, the host adapters 305, 310, and 315 provide a communication interface for any one or more of host systems 205, 210, 215, and may be used to manage communications and data operations between one or more host systems and the cache memory.

Each of the disk adapters 335, 340, and 345 are coupled to and between the cache memory 320 and a corresponding one of the disk data storage devices 350, 355, and 360. The disk adapters 335, 340, and 345 are responsible for the backend management of operations to and from a portion of the disk data storage devices 350, 355, 360.

The disk adapters 335, 340, and 345 contain lists 100 for holding information relevant to the each of the different prefetch tasks with which the data units stored on the disk data storage devices 350, 355, 360 are involved. In other embodiments, the lists 100 may reside on other components of a data storage system 220, 225, 230, or, specifically for the system 220, on the host adapters 305, 310, and 315 or the cache memory 320. The lists 100 contain information that includes but is not limited to location information and statistical information about the specific prefetch tasks. Each of the disk data storage devices 350, 355, 360 includes one or more physical devices, such as disks, and is organized and segmented into one or more logical volumes (LVs) 380, which are logical representations of physical volumes.

Variations to the architecture illustrated in FIG. 2 are possible. For example, each one or more of the disk adapters 335, 340, and 345 may manage read and write operations associated with more than a single disk, and a single disk may be managed by more than one disk adapter. Moreover, a logical volume 380 may span multiple disks associated with a disk adapter, or any part of one or more disks associated with a disk adapter may be considered a logical volume 380, although the term logical volume 380 is not intended to be limited by these examples.

Cache management functions are provided throughout data storage system 220. Thus, data storage system 220 shown in block diagram form in FIG. 2 includes prefetch manager 11 to provide prefetch management functions. In the preferred embodiment shown in FIG. 2, prefetch manager 11 is resident on the disk adapters 335, 340, and 345. Alternatively, the prefetch manager 11 can be resident in any one location such as cache memory 320, disk adapters 335, 340, and 345, and host adapters 305, 310, and 315, or distributed over one or more of such locations.

In order to improve data processing system performance, a data processing system with the present data storage system does not wait for disk adapters 335, 340, and 345 to read or write data directly to or from the appropriate disk data storage device(s) but rather, data to be written to or read from the disk data storage device(s) is stored in cache memory 320. The present invention is primarily directed to disk data storage device read requests by a host system, although managing write requests will also benefit by the use of the present invention. In the preferred embodiment, cache memory 320 includes high speed semiconductor memory whose data is rapidly accessible to both the disk adapters 335, 340, and 345 and the host adapters 305, 310, and 315.

As also illustrated in FIG. 2, the cache memory 320 may include a data area 325 and meta-data area 330. The data area 325 is an area of cache memory 320 containing cache-slots 514 for relatively temporary in-cache storage of data units. The headers for each of the cache-slots contains time stamps 411 for keeping track of when a given data unit was last stored in cache memory or when it was last used by a host processor. The data area provides relatively quick access to data units as compared to the operation of disk data storage devices 350, 355, and 360. The meta-data area 330 stores meta-data, or information, including a cache contents index/directory, about data units stored in disk data storage devices 350, 355, and 360. The information is preferably organized on a device by device basis with one "table" 412, for each disk data storage device. Each device table is further organized by device storage elements. Each table 412 is indexed, for example, by track or other portion of a logical volume 380, for storing the meta-data.

Each of the disk adapters 335, 340, and 345 control data read and write operations associated with corresponding disk data storage devices 350, 355, and 360. Each of the disk adapters 335, 340, and 345 may also enable communications between a corresponding disk data storage device and the cache memory 320. The cache memory 320 may facilitate data transfer between any one of the host adapters 305, 310, and 315, and any one of the disk adapters 335, 340, and 345. In addition, to the extent that data residing in disk data storage devices 350, 355, and 360 may be transferred between disks, the cache memory 320 may facilitate such disk-to-disk data transfer.

The disk adapters 335, 340, and 345 perform data operations to and from the cache memory 320, for example, in communications with other adapters, processors or directors, and other components of the data storage system. Generally, the cache memory 320 may be used in facilitating communications between components in the data storage system.

An embodiment of a data storage system 220 may include a data storage controller or processor 22 used to manage and monitor the data storage system 220. The processor 22 may be any one of a variety of commercially available processors, such as an INTEL-based processor, and the like.

In the embodiment of the present invention illustrated in FIG. 2, the processor 22 may be connected to the cache memory 320 through the connection 32. A computer program product in the form of cache memory control software 800 may be used to implement the prefetch manager 11. In the embodiment of the present invention illustrated in FIG. 2, the cache memory control software 800 is loaded into and out of the data storage system 220 via a computer readable medium in processor 22. In operation, it is preferred that the components of the cache memory control software 800 that implement the prefetch manager 11 reside on a computer readable medium in each of the disk adapters 335, 340, 345. In various embodiments, the cache memory control software 800 or components thereof may be distributed among the host adapters 305, 310, 315, the disk adapters 335, 340, 345, the cache memory 320, and other processors in the data storage system 220 or be resident on one or more of these. Further, it will be understood by those skilled in the art that the computer program product defining the operations and methods herein described are deliverable to a computer such as processor 22 or disk adapters 335, 340, 345 and host adapters 305, 310, 315 in many forms, including but not limited to (1) being permanently stored on non-volatile Read only Memory (ROM) or (2) being alterably stored on writable storage media such as compact disks (CDs), random access memory (RAM) devices, floppy disks, and other magnetic and optical media, or (3) being conveyed to a computer through communication media, for example using baseband signaling or broadband signaling techniques, as in an electronic network such as the Internet or telephone modem lines. The operations and methods may be implemented in a software executable out of a memory by a computer such as processor 22 or disk adapters 335, 340, 345 and host adapters 305, 310, 315, or as a set of instructions embedded in a carrier wave. Alternatively the operations and methods may be embodied in whole or in part using hardware components such as Application Specific Integrated Circuits (ASICs), state machines, controllers or other hardware components or devices, or a combination of hardware and software components.

In addition, similar software components may exist in each of the other processors associated with data storage systems such as 225, 230. In other embodiments, this software 800 may also reside on any of the host systems 205, 210, 215 or on computer readable medium accessible by host systems 205, 210, 215 or processor 22.

Figure 3:
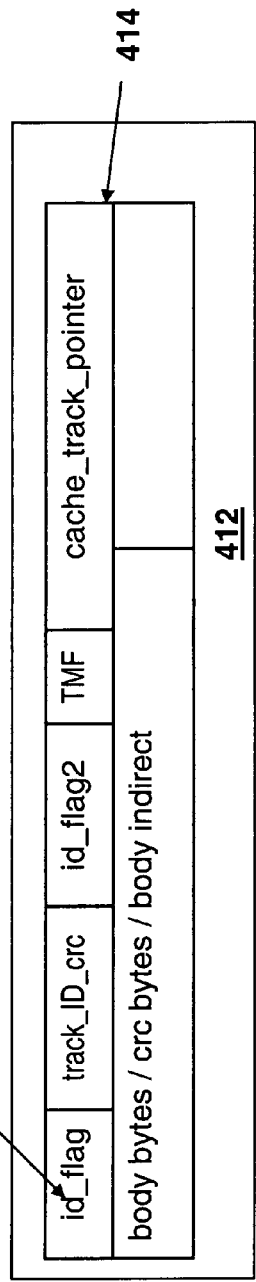
FIG. 3 is a block diagram of a table entry in a table in the meta-data area 330 shown in FIG. 2.

As used herein, the meta-data table 412 refers broadly to a collection of meta-data for ready reference. In an embodiment of the invention, there may be a portion of a meta-data table associated with each portion of a logical volume 380. Virtually every operation conducted by the data storage system 220 will access the meta-data table 412. It is accessed, for example, when a track needs to be locked or unlocked, when it is necessary to identify whether or not a track is in cache, or whether a mirror is valid, or while application bits need to be set. Variations to the meta-data table 412 illustrated in FIG. 3 are possible. For example, there may be another meta-data table or other method to store the data unit information.

Figure 5:
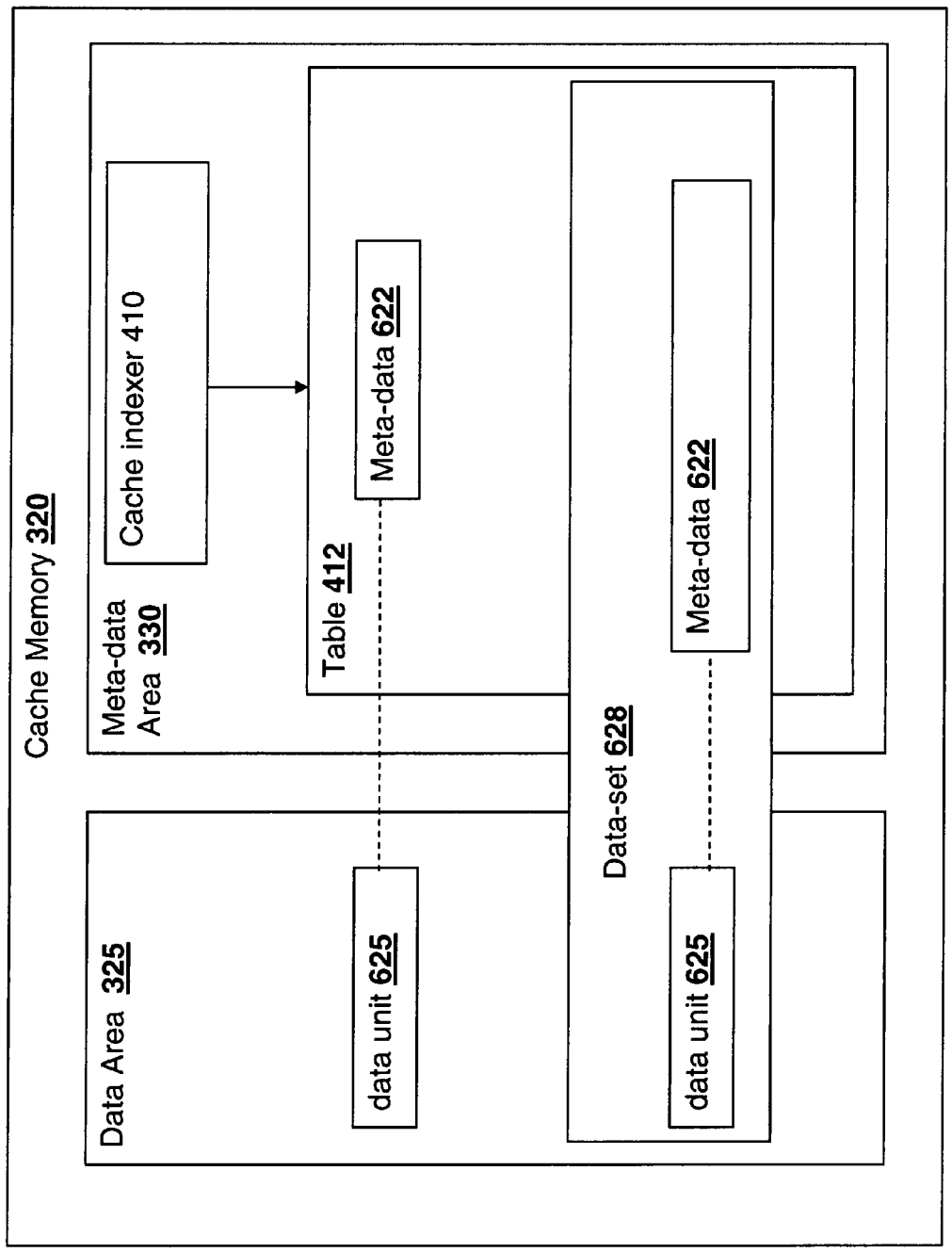
FIG. 5 is a block diagram showing the organization of data in the cache memory 320 in FIG. 2.

FIG. 5 is a block diagram showing the organization of data in the cache memory 320 in FIG. 2, according to one embodiment of the present invention. As noted above the cache memory 320 is organized into a data area 325 for storing data units, shown as 625, and a meta-data area 330 for storing meta-data, shown as 622 associated with the data unit 625. A data-set 628 comprises the data unit 625 and the meta-data (table entry 414) associated with the data unit 625. The cache-slot in which the data unit is stored has a back-pointer to the table entry 414 with which is it associated and possibly a copy of the associated meta-data.

It should be noted that the data units are only temporarily stored in the cache memory 320. As noted above, each of the disk data storage devices 350, 355, 360 contains physical devices, such as disks, that may be organized and segmented into one or more logical volumes (LVs) 380, which are logical representations of physical storage space. Data units may be considered to be stored on disk data storage devices 350, 355, 360, or the logical volumes 380. A data-set 628 comprises the data unit 625 and the meta-data (table entry 414) associated with the data unit 625, no matter where the data unit 625 is stored.

Figure 4:
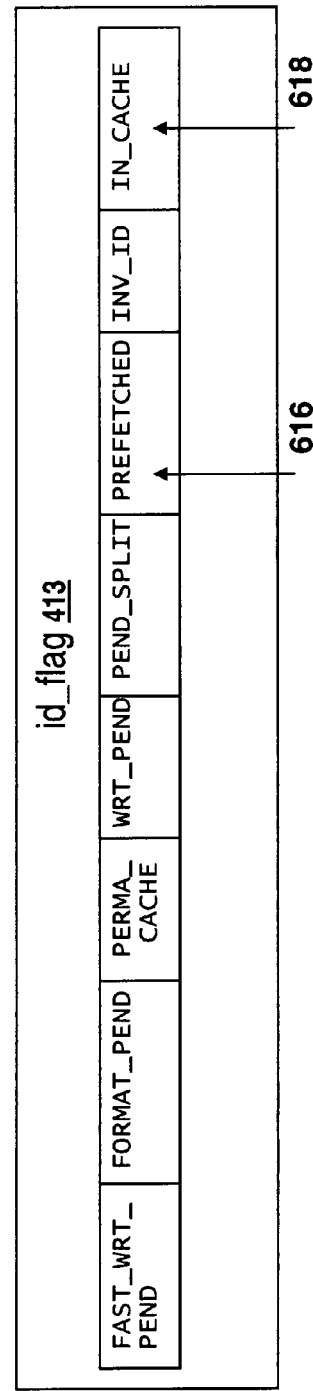
FIG. 4 is a block diagram of further detail of the table entry shown in FIG. 3.

A meta-data table 412 may have multiple table entries 414, also known as track IDs or TIDs, each comprising multiple fields to assist in keeping track of the use of the data unit. FIG. 3 is an illustration of a meta-data table entry 414 for storing the meta-data, according to an embodiment of the invention. As shown in FIG. 3, table entry 414 indicates application designations for each field of the meta-data area 330. In the illustrated embodiment, the table entry 414 also has an id_flag field 413. As shown in FIG. 4, the id_flag field 413 is organized into multiple fields that could comprise sub-fields for storing meta-data describing the status of and other details about tracks. In the illustrated embodiment, the id_flag field 413 has a PREFETCHED field 612, for storing meta-data identifying whether the track has been prefetched into the cache 325; and an in_cache flag 618, for storing meta-data indicating that a copy of the data unit may be found in a cache slot 514 in the data area 325 of cache memory 320.

As noted above, prefetching a data unit does not necessarily mean that the data unit will be used. Tail cutting may be used to limit the number of data units that are associated with a prefetch task and that are stored in cache memory. Sequential prefetching with tail cutting may be implemented in the data storage system shown in FIG. 2.

The input criteria used by a prefetch manager 11 component of prefetch manager 11 in implementing sequential prefetching with tail cutting includes three elements, namely: (a) the minimum number of data units which must be retrieved and stored in cache memory and used by the system before the cache management system recognizes a sequential data access in progress; (b) the number of data units to bring into the cache memory during each prefetch operation and maximum number of data units which the cache management system is to prefetch ahead; and (c) the maximum number of sequential data units to be stored in cache before the cache-slots containing the previously used data units are reused or recycled to make room for new data units written to these location(s). The three criteria required by the cache management system are maintained by the prefetch manager 11 on each disk adapter 335, 340, 345 for each device coupled to the controller.

Figure 6:
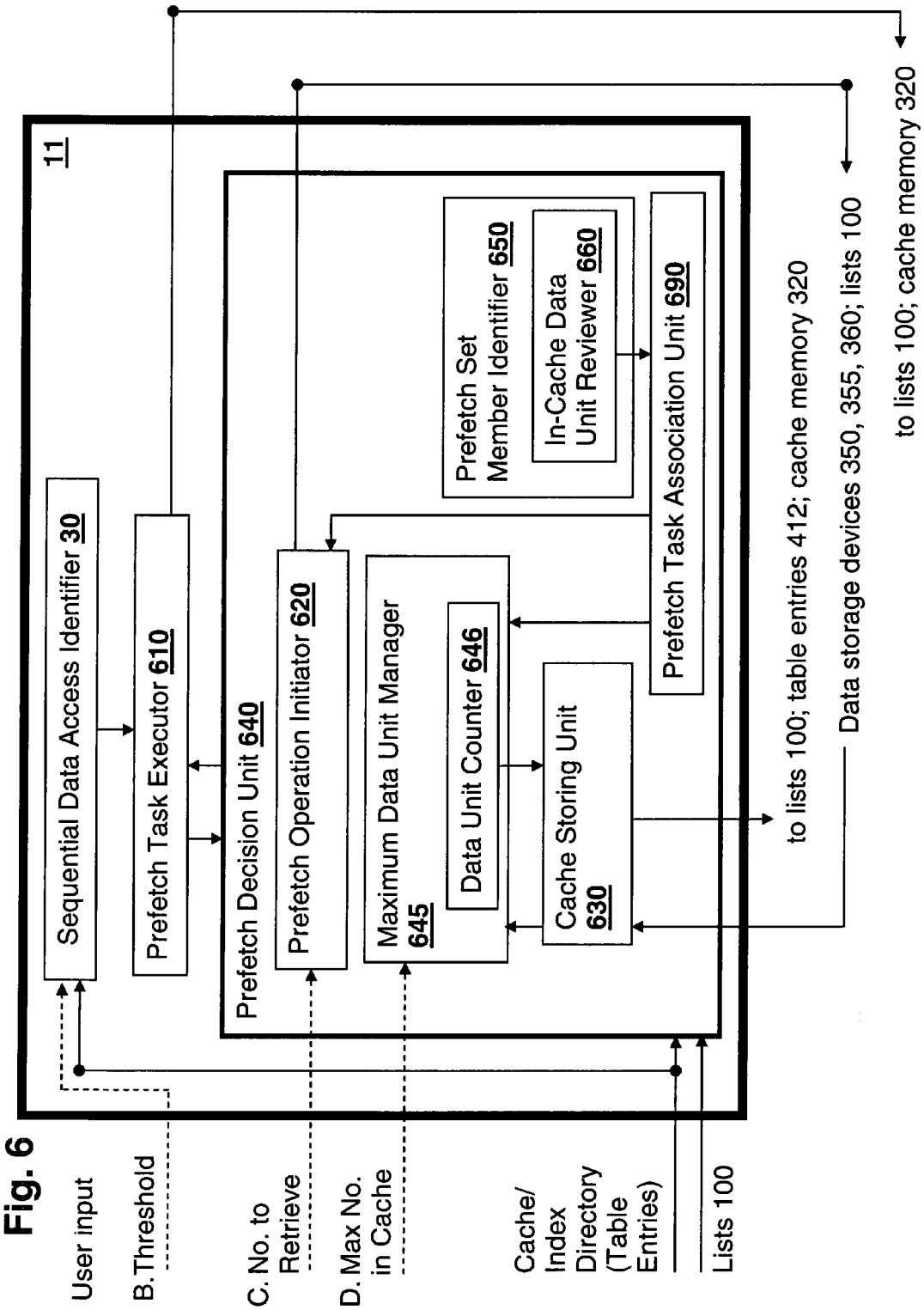
FIG. 6 is a block diagram of a prefetch manager 11 for one embodiment of the present invention.

In conventional prefetch implementations, tail cutting can be implemented so long as the prefetch operation executes quickly enough that data units are prefetched and stored in the cache memory faster than they are required in a read request. When the prefetch operation executes slower than a host processor requests a read of its next data unit, tail cutting, prefetch operations and prefetch tasks are disrupted. FIG. 6 shows in block diagram form the prefetch manager 11 of the present invention, in which a tail cut count is maintained even when data units are being read faster than they can be prefetched into cache memory. In FIG. 6, the sequential data access indicator 30 utilizes the threshold input (A), and input from the cache contents index/directory (tables 412) to provide an indication of a sequential data access in progress. The prefetch manager 11 may selectively determine on a process-by-process basis the threshold criteria to be established by establishing the initial default criteria for each disk data storage device.

Upon receiving an indication that a sequential data access is in progress for a given process, depending on the device activity, the prefetch task executor 610 may open a prefetch task. The prefetch task executor 610 creates lists 100 that include location and statistical information about the prefetch task. The prefetch task executer 610 is also responsible for terminating a task. If no requests for data units prefetched pursuant to the task have arrived after a specified time, the prefetch task executer 610 will erase the lists 100 associated with the task and update the cache memory 320. Upon issuance of a prefetch task, the prefetch operation initiator 620 utilizes the second criteria (B) that is, the number of data units to bring into cache memory in each prefetch operation and the maximum number of tracks to prefetch ahead, to initiate a prefetch operation by providing a prefetch instruction to the appropriate disk data storage device controller to read a selected set of data units for the given process. The prefetch decision unit 640 is arranged to decide whether or not to have the prefetch operation initiator 620 issue prefetch operation instructions. The prefetch decision unit 640 is further arranged to determine whether to continue or terminate the prefetch operations. The prefetch operation initiator 620 is arranged to send prefetch operation instructions to the disk data storage devices 350, 355,360 via the disk adapters 335, 340, and 345. It also updates information in the lists 100.

Further, the third parameter (C) is the maximum number of data records to be maintained in cache for this process before the records stored in cache memory for this process are removed. Maximum data unit manager 645 receives the third criteria or parameter as well as cache contents index/directory information and information from lists 100 in the disk adapters to provide an indication to the disk data storage device controller to control the reuse or recycling of previously used cache memory locations allocated to the given process and to reset the in-cache flag or bit associated with the data which is removed.

FIG. 6 shows in block diagram form the prefetch manager 11. In the present invention, the prefetch manager 11 constitutes a prefetch management system for monitoring and controlling prefetches of data units into and out of a cache memory. The prefetch management system 11 has a sequential data access indicator 30 for identifying sequences, a prefetch task executor 610 for opening and terminating prefetch tasks to prefetch series of data units from off-cache logical locations for storage in the cache memory, and a prefetch decision unit 640 for making decisions about prefetch operations and prefetch tasks and data storage in cache. The sequential data access indicator 30 provides input to the prefetch task executor 610, which in turn provides inputs to the prefetch decision unit 640.

The prefetch decision unit 640 further has a prefetch set member identifier 650 for determining whether or not a data unit that is read from an off-cache logical location on a logical volume 380 is a data unit in a prefetch series. The prefetch decision unit 640 also has a prefetch task association unit 690 for associating data units with a prefetch task, a prefetch operation initiator 620 for initiating prefetch operations to prefetch selected sets of data units; and a cache storing unit 630 for directing storage of the data units in the cache memory in accordance with a prefetch task. The prefetch set member identifier 650 provides inputs to the prefetch task association unit 690, which provides inputs to the maximum data unit manager 645 and the prefetch operation initiator 620. The maximum data unit manager 645 and the cache storing unit 630 are arranged to provide inputs to each other. (The cache storing unit 630 updates the list 100 and table entries about the association of data units. In some embodiments, the input to the prefetch operation initiator 620 can come indirectly from the lists 100 and table 412 instead of directly from the prefetch task association unit 690). Further, the cache storing unit 630 is arranged to have as inputs information about the data units that arrive from disks and need to be stored in cache from the disk data storage devices 350, 355,360 via the disk adapters 335, 340, and 345.

The prefetch decision unit 640 and the sequential data access indicator 30 are arranged to have as inputs information from the tables 412. The prefetch decision unit 640 is also arranged to have as inputs information from the lists 100. The information from the tables 412 and the lists 100 includes information about read requests, the prefetched data units requested by read requests, the data units that are stored in the cache memory and that are associated with a prefetch task and other location information and statistical information about the specific prefetch tasks. Specifically, the prefetch decision unit 640 is arranged to have as inputs information about the association of data units with a prefetch task and information about the logical location of the data units. It will be understood that the representation of inputs from the tables 412 and the lists 100 into the general block representing prefetch decision unit 640. in FIG. 6 is simplified. For the sake of readability, the inputs into the blocks representing the components of prefetch decision unit 640 are not shown in FIG. 6. However, it will be understood that each of the components of the prefetch decision unit 640 has inputs from the tables 412 and the lists 100.

The prefetch set member identifier 650 of the prefetch decision unit 640 may also have an in-cache data unit reviewer 660 to review selected data units in the cache memory to determine whether or not a data unit is a prefetch series member. Further, the maximum data unit manager 645 is arranged to maintain a maximum number of data units that are associated with the first prefetch task in the cache memory. The maximum data unit manager 645 has as inputs information from the tables 412 and the lists 100 about the number of data units associated with a given prefetch task. It also has a data unit counter 646 for tracking how many data units are associated with a given prefetch task. Finally, the maximum data unit manager 645 has as an output through the cache storing unit 630 a signal to the cache memory 320 to remove from storage in cache memory one or more data units that are associated with the first prefetch task.

Figure 7:
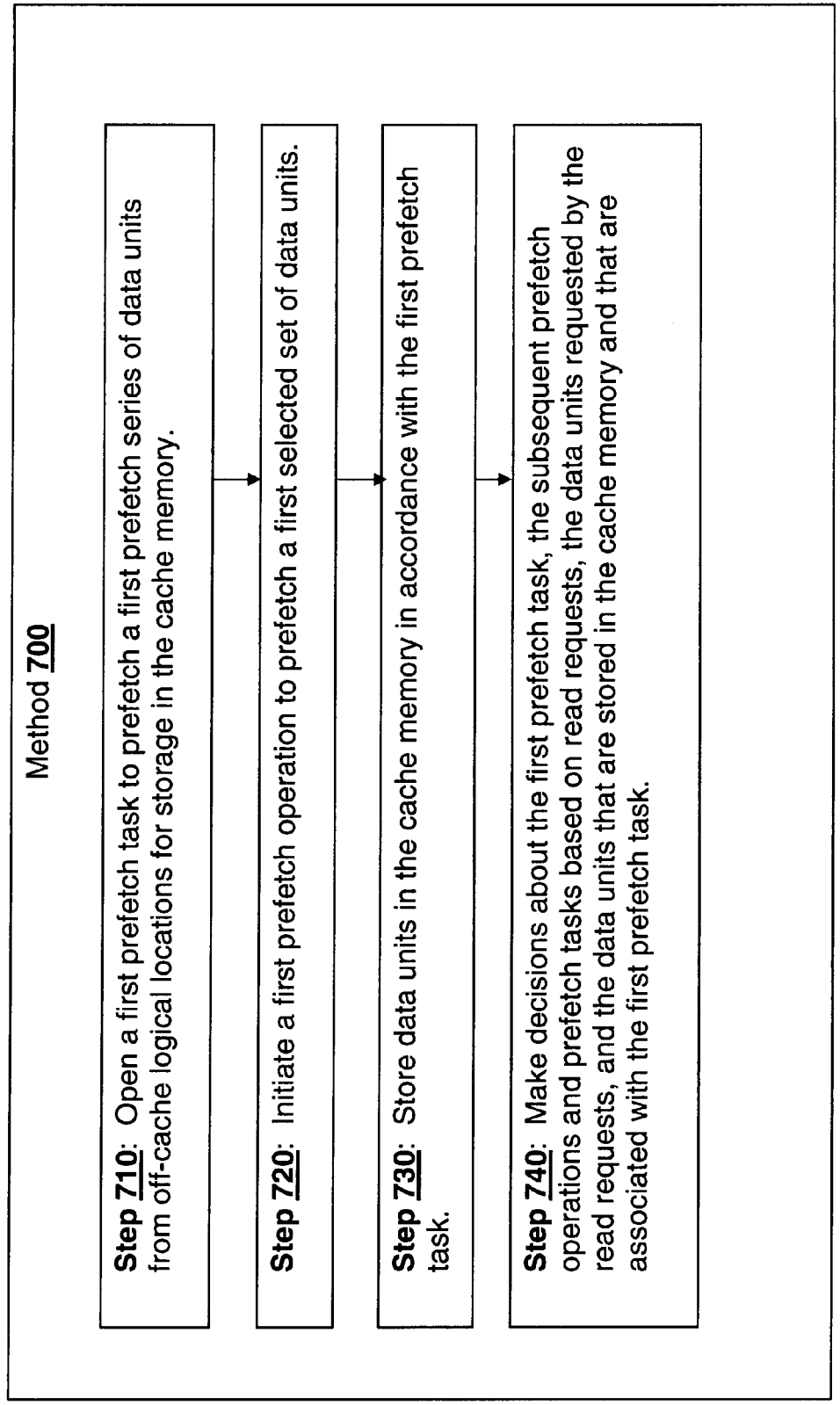
FIG. 7 is a flow diagram of a method 700 of the present invention.

FIG. 7 is a flow diagram of a method 700 for managing prefetching of data units into the cache memory 320 shown in FIG. 2 according to an embodiment of the invention. In operation, the method 700 begins in a step 710 by causing a first prefetch task to be opened, in some embodiments by the prefetch task executor 610, to prefetch a first prefetch series of data units from off-cache logical locations for storage in the cache memory. Prefetching proceeds in a step 720, in which a first prefetch operation is initiated, in some embodiments by the prefetch operation initiator 620, to prefetch a first selected set of data units; and in a step 730, data units are stored in the cache memory, in some embodiments by the cache storing unit 630, in accordance with the first prefetch task. In a step 740, decisions about the first prefetch task, the subsequent prefetch operations and prefetch tasks based on read requests, the data units requested by the read requests, and the data units that are stored in the cache memory and that are associated with the first prefetch task. In some embodiments, the step 740 is performed by the prefetch decision unit 640.

Figure 8:
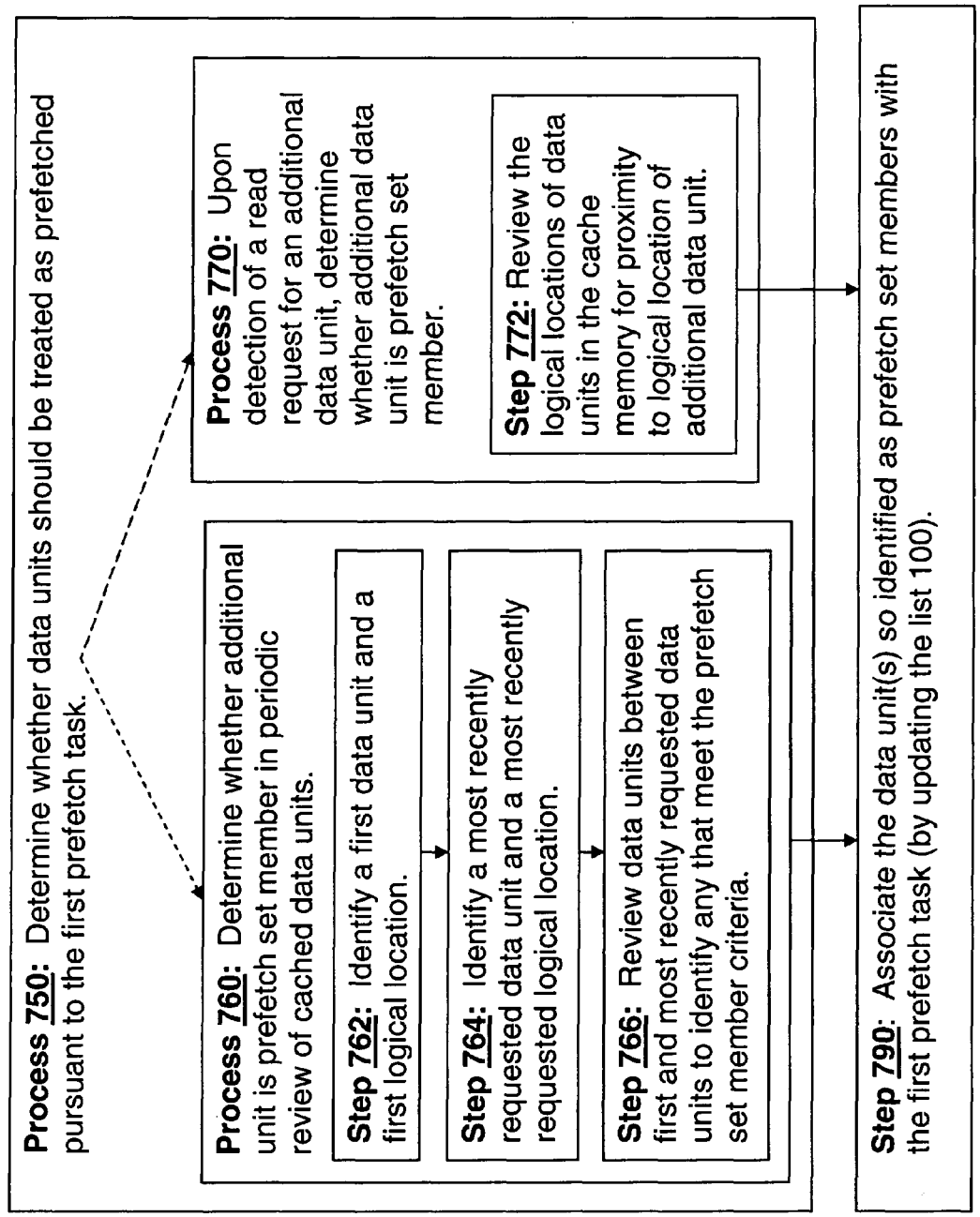
FIG. 8 is a flow diagram of a process 750 of the present invention.

When the data storage system 220, 225, or 230 receives a request to read an additional data unit, and it is determined that the additional data unit is not to be found in-cache, the additional data unit is read from an off-cache physical location mapped to a logical location in the logical volume 380. A process 750 for determining whether the additional data unit should be treated as prefetched pursuant to the first prefetch task is shown in FIG. 8.

The process 750 may be executed with a process 770, which executes upon detection of a read request for an additional data unit that is being read from an off-cache logical location on a logical volume 380, or, in another embodiment, with a process 760, which executes during reviews of selected data units stored in the cache memory.

Turning first to the embodiment implementing the process 770 for testing for membership in a prefetch series for upon detection of a read request, the process 770 starts with a step 772 of reviewing the data units stored in the cache memory to determine whether any data unit meets the following criteria: it is stored in the cache memory; it is associated with the first prefetch task; and it has a logical location that is proximal to the logical location of the additional data unit. If such a proximal data unit is found, the additional data unit may be considered to be a prefetch set member.

For example, in one embodiment, the data unit's logical location would be considered proximal to the logical location of the additional data unit when it is within a selected number of data units from the logical location of the additional data unit. In another embodiment, it is considered proximal if the data unit is adjacent to the additional data unit off-cache. In other embodiments, it is considered proximal to the logical location of the additional data unit when, using a probability analysis, the distance between the logical locations of the additional data unit and the proximal data unit is sufficiently small that the likelihood that the additional data unit is a member of the same prefetch series as the proximal data unit is above a selected level.

In one embodiment of step 772, the logical locations of all of the data units stored in cache memory and associated with first prefetch task are reviewed for proximity to the logical location of the additional data unit. In other embodiments, only a selected number of data units are reviewed. They could be selected because they were the data units that were the most recently prefetched into the cache memory, or they may be chosen using any suitable mechanism. In one embodiment, only the logical location of the data unit that was prefetched into cache memory immediately before the additional data unit is reviewed.

Alternatively, the process 750 may be executed using a process 760 in which the determination of membership of data units in the first prefetch series occurs during reviews of selected data units stored in the cache memory. In the process 760, the in-cache data unit reviewer 660 conducts a review, which may be periodic, of selected data units stored in the cache memory to determine whether or not any of the selected data units stored in the cache memory is a first prefetch series member.

In one embodiment, the process 760 starts with a step 762 of identifying a head data unit and a head logical location. The head data unit is a data unit that meets three criteria: it is currently stored in cache memory; it is associated with the first prefetch task; and it is the data unit in the sequence being prefetched pursuant to the first prefetch task that has a logical location closest in proximity to the logical location of the data unit that is first in the sequence being prefetched pursuant to the first prefetch task (hereinafter known as "initial data unit in the sequence").

The head data unit may be the initial data unit in the sequence itself. However, if tail cuts have been performed on a portion of the sequence that has been prefetched, the head data unit is the data unit that has a logical location closest in proximity to the location of the initial data unit in the sequence and that has not been removed in accordance with the tail cut. In that case, it would be the next data unit to be removed from the cache memory in accordance with the prefetch task's next tail cut.

Although it not essential for the proper operation of the invention, in the embodiment described herein, most of the time the head data unit is the data unit that was the least recently stored in the cache memory of all of the data units that are associated with the first prefetch task and that are still in-cache. The head logical location is the logical location of the head data unit.

The process 760 proceeds to a step 764 of identifying a most recently requested data unit and a most recently requested logical location. The most recently requested data unit is a data unit that also meets three criteria: it is stored in the cache memory; it is associated with the first prefetch task; and, of all of the data units stored in the cache memory, it was most recently requested in a read request associated with the first prefetch task. The most recently requested logical location is the logical location of the most recently requested data unit.

In a step 766, the data units in the cache memory are reviewed to determine whether any data unit meets the criteria to be a member of an in-cache set of data units. The in-cache set is a set of data units that have been stored in the cache memory and that have logical locations between the head logical location and the most recently requested logical location.

Upon determination, using the process 750, that a data unit is a first prefetch series member, in a step 790, the data unit(s) so identified as prefetch set members are associated with the first prefetch task. In one embodiment, the prefetch task association unit 690 makes the association by updating the lists 100 in the disk adapter 335, 340, 345 and in some embodiments by also updating the id_flag field 413 of the table entry 412 of the data unit(s) associated with the first prefetch task. The read requests (made, for example, by host adapters 305, 310, 315) and the prefetching are monitored in order to effectively manage the open prefetch tasks and operations. As noted above, in the step 740, when prefetch decisions are made, any data unit associated with the first prefetch task are treated as having been prefetched into cache memory in accordance with the first prefetch task.

Figure 9:
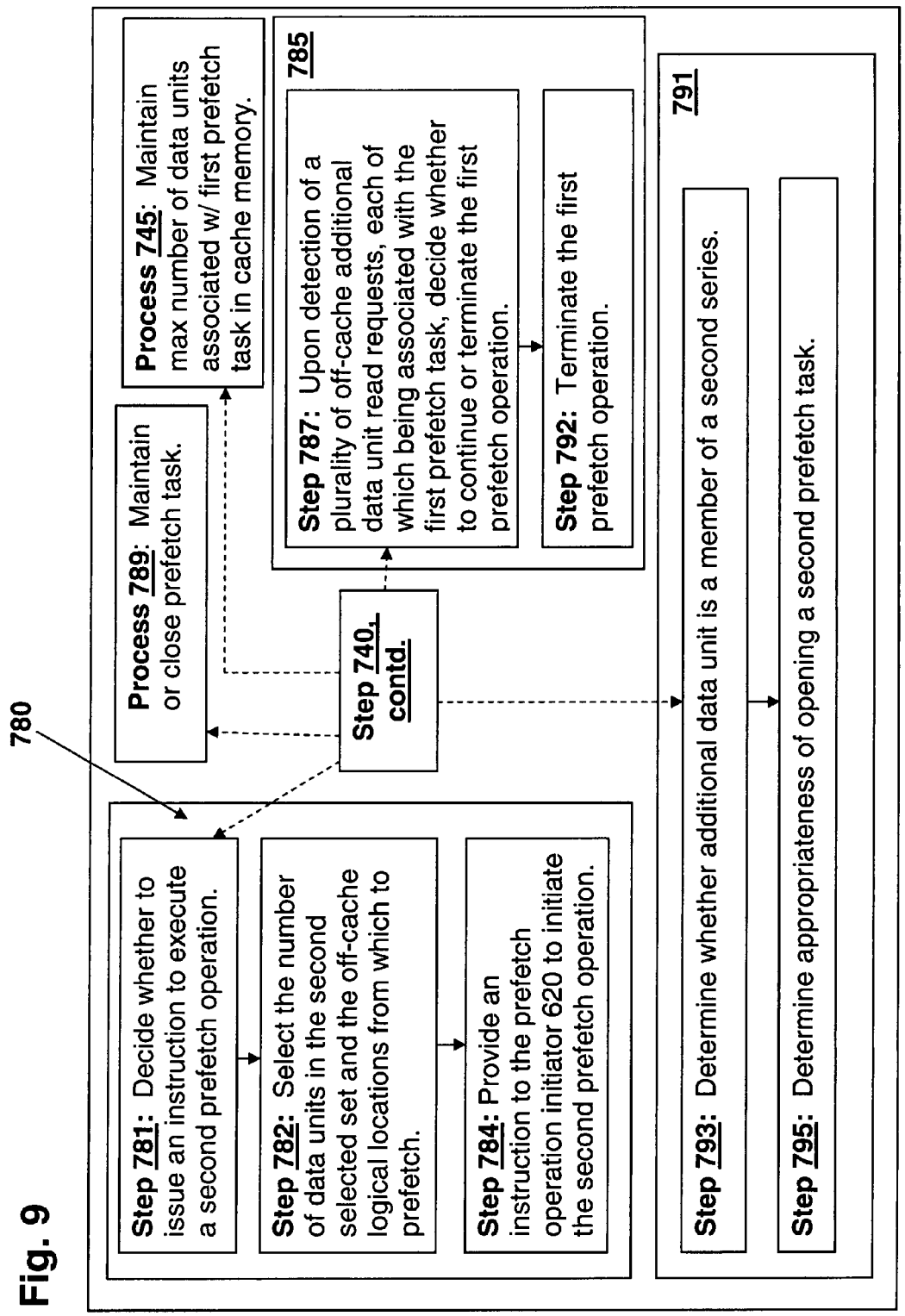
FIG. 9 is a flow diagram of further detail of the step 740 shown in FIG. 7.

Turning now to FIG. 9, one of the decisions made in step 740 involves managing the number of prefetched data units in a cache memory. In a process 745, a maximum number of data units that are associated with the first prefetch task in the cache memory are maintained. Step 745 may be implemented in some embodiments with the maximum data unit manager 645, using the data unit counter 646. When the number of data units that are associated with the first prefetch task in the cache memory exceeds the maximum number, one or more data units that are associated with the first prefetch task are removed from storage in cache memory to make room for other data units that will be prefetched into the cache memory pursuant to the first prefetch task or through any other task or operation.

Another decision made in step 740 is whether or not to issue an instruction to execute a second prefetch operation for prefetching a second selected set of data units from off-cache logical locations for storage in the cache memory. In order to make the decision, the step 740 invokes a process 780, which has a step 781 in which decisions are made whether to issue an instruction to execute a second prefetch operation using information from tables 412 and lists 100 on the association of the additional data unit with the first prefetch task and the off-cache logical location of the additional data unit. The step 781 may be performed in some embodiments by the prefetch decision unit 640. In a step 782, the number of data units in the second selected set and the logical locations from which to prefetch the second selected set are selected, by, in some embodiments, the prefetch decision unit 640 using the logical location of the additional data unit as the basis for the selections. In a step 784, the second prefetch operation may be initiated to prefetch the second selected set of data units from the selected off-cache locations, by, in some embodiments, the prefetch operation initiator 620.

Another decision made in step 740 is whether to continue or terminate the first prefetch operation. In order to make the decision, the step 740 invokes a process 785, which has a step 787 in which decisions are made (in some embodiments by the prefetch decision unit 640) whether to continue or terminate the first prefetch operation, upon detection of a plurality of additional data units, each of which having been read from an off-cache logical location on a logical volume 380, and each of which being associated with the first prefetch task. Decisions whether to continue or terminate the first prefetch operation, are made based on the additional data units, the number of additional data units, associations of the additional data units with the first prefetch task, and the logical locations of the additional data units. When the decision is to terminate the first prefetch operation, in a step 792, an instruction is sent (in some embodiments, by the prefetch decision unit 640 to the prefetch task executor 610) to terminate the first prefetch operation.

Another decision made in step 740 is whether to continue or terminate the first prefetch task. In order to make the decision, the step 740 invokes a process 789, in which read requests are reviewed for data units prefetched into the cache memory. If, after a predetermined time, read requests are not issued for the already prefetched data units, a conclusion may be made that the prefetch task with which the data units are associated is no longer active, and a decision may be made to close the prefetch task. If read requests are issued for the already prefetched data units, the prefetch task is still alive and will be kept open, and management tasks for open prefetch tasks, such as cut tails, will be performed on the data units in the cache memory associated with the prefetch task.

Another decision made in step 740 is whether to open a second prefetch task. In some embodiments, the decision is performed by the sequential data access indicator 30. In order to make the decision, the step 740 invokes a process 791, which has a step 793 of determining whether the additional data unit is a member of a second series of data units being read from off-cache logical locations when the additional data unit is not a first prefetch series member. If it is found to be so, in a step 795, a decision process is initiated, in some embodiments, by a prefetch task executor 610, to determine appropriateness of opening a second prefetch task to prefetch the second prefetch series of data units for storage in the cache memory.

Returning to the example introduced above, in which sequential prefetching with tail cutting is initiated after three Miss operations, and in which the prefetch operation takes longer to execute than issuing five read requests, a first prefetch task was opened to prefetch a first sequence of adjacent data units (a, b, c, ... ). As before, a prefetch operation for prefetching data units d, e, initiates, followed by a prefetch operation for prefetching data units f, g, then a prefetch operation for prefetching data units h, i. When, as before, the data storage system is unable to complete the prefetching of data units i, j, k before the read requests are issued for them, the read requests result in a Miss operations. In prior art systems, issuance of Miss operations for data units i, j, k, would have resulted in the prefetched data unit count not being updated.

Using the present invention, the data units i, j, k are tested and determined to be members of the first sequence. The prefetch manager 11 associates the data units i, j, k with the first prefetch task and the prefetched data unit count continues. The overhead associated with starting and stopping unnecessary prefetch operations is prevented. In addition, the set of data units d, e, f, g, h does not constitute an orphan prefetch sequence. The prefetched data unit count continues to be used as input to the tail cutting implementation.

The method 700 and process 750 may be embodied in a computer program product such as memory control software 800 residing on a computer readable medium for managing access to cache data in a cache memory 320. The memory control software 800 has instructions for causing a computer to implement the method 700 and process 750 shown in FIGS. 7, 8, 9. Specifically it has instructions for performing the steps for method 700, namely the step 710 of opening a first prefetch task to prefetch a first prefetch series of data units from off-cache logical locations for storage in the cache memory, particularly the step 720 of initiating a first prefetch operation to prefetch a first selected set of data units; and a step 730 of storing data units in the cache memory in accordance with the first prefetch task. The memory control software 800 has instructions for causing a computer to perform the step 740 of making decisions about the first prefetch task, the first prefetch operation and subsequent prefetch operations and prefetch tasks based on read requests, the data units requested by the read requests, and the data units that are stored in the cache memory and that are associated with the first prefetch task.

The memory control software 800 has instructions for causing a computer to perform the process 750 of determining whether or not an additional data unit that is read from an off-cache logical location on a logical volume 380 is a first prefetch series member comprising a data unit in the first prefetch series. Upon determination that the additional data unit is a first prefetch series member, the memory control software 800 has instructions for causing a computer to perform the step 790 of associating the additional data unit with the first prefetch task. The instructions for causing a computer to perform the step 740 of making decisions further comprises instructions for causing a computer to treat the additional data unit as having been prefetched into cache memory in accordance with the first prefetch task upon association of the additional data unit with the first prefetch task.

CONCLUSION

Using the prefetch management processes and systems of the present invention described herein, a computer system may use tail cutting while prefetching, even when the data units that are being prefetched are required for a read request before a prefetch operation is completed or even issued. Providing a prefetch management system of the present invention allows the computer system to limit the pollution of cache memory by sequential read data, to decrease the number of data units treated as Read Miss operations, and to reduce the overall number of orphan prefetches in a cache memory while maximizing the effectiveness of the prefetch operations that are issued.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for prefetching data units into a cache memory, comprising:
   opening a first prefetch task to prefetch a first prefetch series of data units from an off-cache memory for storage in the cache memory, the off-cache memory being different from the cache memory, the opening the first prefetch task including:
      initiating a first prefetch operation to prefetch a first selected set of data units in the first prefetch series; and
      storing the first selected set of data units in the cache memory in accordance with the first prefetch task;
   making decisions about the first prefetch task, subsequent prefetch operations and prefetch tasks based on read requests, data units requested by the read requests, and data units that are stored in the cache memory and that are associated with the first prefetch task;
   determining whether or not an additional data unit, that is read from the off-cache memory in an operation separate from the first prefetch operation, is a first prefetch series member comprising a data unit that corresponds to the first prefetch series and that is not included in the first selected set of data units of the first prefetch series, wherein the determining is performed after the first selected set of data units is stored in the cache memory;
   upon determination that the additional data unit is a first prefetch series member, associating the additional data unit with the first prefetch operation in the cache memory;
   wherein making decisions includes, after associating the additional data unit with the first prefetch operation, subsequently determining whether to execute a second prefetch operation to prefetch a second set of selected data units from the off-cache memory based on treating the additional data unit as having been prefetched into cache memory in accordance with the first prefetch operation and based on a logical location of the additional data unit in the off-cache memory, wherein the additional data unit that is associated with the first prefetch operation is different from data units in the second set of selected data units that are prefetched in the second prefetch operation.

2. The method of claim 1, further comprising:
   determining whether or not the additional data unit is a first prefetch series member upon detection of a read request for reading the additional data unit from the off-cache memory.

3. The method of claim 2, wherein determining whether or not the additional data unit is a first prefetch series member comprises identifying at least one data unit that is stored in the cache memory, that is associated with the first prefetch task, and that has a logical location that is within a selected number of data units from the logical location of the additional data unit.

4. The method of claim 1, further comprising:
conducting a review of the data units stored in the cache memory to determine whether or not any of the data units stored in the cache memory is a first prefetch series member.

5. The method of claim 4, further comprising:
identifying a head data unit comprising a data unit that is currently stored in cache memory, that is associated with the first prefetch task, and that is the data unit in the sequence being prefetched pursuant to the first prefetch task that has a logical location closest in proximity to the logical location of the data unit that is first in the sequence being prefetched pursuant to the first prefetch task, the head data unit having a head logical location associated therewith; and
identifying a most recently requested data unit comprising a data unit that is stored in the cache memory, that is associated with the first prefetch task and that was most recently requested in a read request of all of the data units stored in the cache memory and associated with the first prefetch task, the most recently requested data unit having a most recently requested logical location associated therewith;
wherein conducting the review comprises identifying an in-cache set of data units comprising a set of data units that have been stored in the cache memory and that have logical locations between the head logical location and the most recently requested logical location; further comprising associating the in-cache set of data units with the first prefetch task.

6. The method of claim 1, wherein making decisions includes:
maintaining a maximum number of data units that are associated with the first prefetch task in the cache memory; and
when the number of data units that are associated with the first prefetch task in the cache memory exceeds the maximum number, removing from storage in cache memory one or more data units that are associated with the first prefetch task.

7. The method of claim 1, wherein the second prefetch operation has associated therewith a selected number of data units in a second selected set, and wherein the method further comprises:
selecting the selected number with reference to the logical location of the additional data unit.

8. The method of claim 1, wherein the second prefetch operation has associated therewith a set of off-cache logical locations from which to prefetch the second selected set, and wherein the method further comprises:
selecting the set of logical locations with reference to the logical location of the additional data unit.

9. The method of claim 1, further comprising:
reading a plurality of additional data units from off-cache logical locations, each of the plurality being associated with the first prefetch task; and
wherein making decisions includes determining whether to continue or terminate any prefetch operation of the first prefetch task, based on the additional data units, the number of additional data units, associations of the additional data units with the first prefetch task, and the logical locations of the additional data units.

10. The method of claim 1, further comprising:
determining, when the additional data unit is not a first prefetch series member, whether the additional data unit is a member of a second series of data units being read from off-cache logical locations; and
when the additional data unit is a member of the second series, initiating a decision process to determine appropriateness of opening a second prefetch task to prefetch the second prefetch series of data units for storage in the cache memory.

11. A computer program product residing on a non-transitory computer readable medium for prefetching data units into a cache memory, comprising instructions for causing a computer to:
open a first prefetch task to prefetch a first prefetch series of data units from off-cache memory for storage in the cache memory, the off-cache memory being different from the cache memory, the instructions for causing the computer to open the first prefetch task including instructions for causing the computer to:
initiate a first prefetch operation to prefetch a first selected set of data units; and
store the first selected set of data units in the cache memory in accordance with the first prefetch task;
make decisions about the first prefetch task, subsequent prefetch operations and prefetch tasks based on read requests, data units requested by the read requests, and data units that are stored in the cache memory and that are associated with the first prefetch task;
determine whether or not an additional data unit, that is read from an off-cache logical location in an operation separate from the first prefetch operation, is a first prefetch series member comprising a data unit that corresponds to the first prefetch series and that is not included in the first selected set of data units of the first prefetch series, wherein the determining is performed after the first selected set of data units is stored in the cache memory; and
upon determination that the additional data unit is a first prefetch series member, associate the additional data unit with the first prefetch operation in the cache memory;
wherein instructions for causing a computer to make decisions include instructions for causing a computer to, after associating the additional data unit with the first prefetch operation, subsequently determine whether to execute a second prefetch operation to prefetch a second set of selected data units from the off-cache memory based on treating the additional data unit as having been prefetched into cache memory in accordance with the first prefetch operation and based on a logical location of the additional data unit in the off-cache memory, wherein the additional data unit that is associated with the first prefetch operation is different from data units in the second set of selected data units that are prefetched in the second prefetch operation.

12. A data storage system, comprising:
a cache memory;
an off-cache memory that is different from the cache memory; and
a data storage controller connected to the cache memory and the off-cache memory to run a prefetch management system, the prefetch management system adapted to prefetch data from the off-cache memory, monitor data read requests from a host processor and to transfer data to the cache memory;
the prefetch management system comprising:
a prefetch task executor adapted to initiate a first prefetch task to prefetch a first selected set of data units of the first prefetch series from the off-cache memory for storage in the cache memory;

the prefetch task executor comprising:
- a prefetch operation initiator adapted to initiate a first prefetch operation to prefetch the first selected set of data units, and
- a cache storing unit adapted to store the first selected set of data units in the cache memory in accordance with the first prefetch task;
- a prefetch decision unit adapted to make decisions about the first prefetch task, the first prefetch operation and subsequent prefetch operations and subsequent prefetch tasks based on read requests, data requested by the host processor data read requests, and data units that are stored in the cache memory and that are associated with the first prefetch task;
- a prefetch set member identifier adapted to determine whether an additional data unit, that is read from the off-cache memory logical location in an operation separate from the first prefetch operation, is a first prefetch series member comprising a data unit that corresponds to the first prefetch series and that is not included in the first selected set of data units of the first prefetch series, wherein the prefetch set member identifier performs the determining after the first selected set of data units is stored in the cache memory;
- a prefetch task association unit adapted to associate the additional data unit with the first prefetch operation in the cache memory;

wherein the prefetch decision unit is further adapted to, after associating the additional data unit with the first prefetch operation, subsequently determine whether to execute a second prefetch operation to prefetch a second set of selected data units from the off-cache memory based on treating the additional data unit as having been prefetched into cache memory in accordance with the first prefetch operation and based on a logical location of the additional data unit in the off-cache memory, wherein the additional data unit that is associated with the first prefetch operation is different from data units in the second set of selected data units that are prefetched in the second prefetch operation.

13. The system of claim 12, wherein the prefetch set member identifier is further adapted to determine whether the additional data unit is a first prefetch series member upon detection of a host processor read request initiating a transfer of the additional data unit from the off-cache memory logical location.

14. The system of claim 12, wherein the prefetch set member identifier is further adapted to determine whether the additional data unit is a first prefetch series member through a review of the logical locations of selected data units stored in the cache memory.

15. The system of claim 14, wherein the prefetch set member identifier further comprises an in-cache data unit reviewer to conduct a review of the logical locations of the data units stored in the cache memory to determine whether any of the data units stored in the cache memory is a first prefetch series member.

16. The system of claim 12, wherein the prefetch decision unit further comprises a maximum data unit manager for maintaining a maximum number of data units that are associated with the first prefetch task in the cache memory; and wherein when the number of data units that are associated with the first prefetch task in the cache memory exceeds the maximum number, maximum data unit manager is further adapted to remove from storage in cache memory one or more data units that are associated with the first prefetch task.

17. The system of claim 12, wherein the prefetch decision unit is further adapted to instruct the prefetch operation initiator to initiate the second prefetch operation based on association of the additional data unit with the first prefetch task and the logical location of the additional data unit and the prefetch operation initiator is further adapted to initiate the second prefetch operation for prefetching a second selected set of data units from the off-cache memory for storage in the cache memory.

18. The system of claim 17, wherein the second prefetch operation has associated therewith a selected number of data units in the second selected set of data units and a set of off-cache memory logical locations from which to prefetch the second selected set of data units; and the prefetch decision unit is further adapted to select the selected number of data units and the set of off-cache memory logical locations with reference to the logical location of the additional data unit.

19. The system of claim 12, wherein when the prefetch management system reads a plurality of additional data units from the off-cache memory and each has been associated with the first prefetch task; and wherein the prefetch decision unit is further adapted to determine whether to continue or terminate any prefetch operation of the first prefetch task, based on the additional data units, the number of additional data units, associations of the additional data units with the first prefetch task, and logical locations of the additional data units in the off-cache memory.

20. The system of claim 12, wherein the cache memory is adapted to respond to the host processor data read request by retrieving the requested data from the cache memory if the requested data is available in the cache memory and the cache memory is further adapted to respond to data write requests by the prefetch management system, and wherein the off-cache memory is adapted to respond to the host processor data read request by retrieving the requested data from off-cache memory logical locations if the data is not available in the cache memory and the off-cache memory is further adapted to respond to the data read requests by the prefetch management system.

* * * * *